(12) United States Patent
Leung

(10) Patent No.: US 12,002,033 B2
(45) Date of Patent: Jun. 4, 2024

(54) BATTERY-LESS ACTIVE AND PASSIVE HYBRID DEVICE FOR SECURE WIRELESS PAYMENT AND METHOD THEREOF

(71) Applicant: Ka Wai Wayne Leung, Hong Kong (HK)

(72) Inventor: Ka Wai Wayne Leung, Hong Kong (HK)

( * ) Notice: Subject to any disclaimer, the term of this patent is extended or adjusted under 35 U.S.C. 154(b) by 702 days.

(21) Appl. No.: 16/968,857

(22) PCT Filed: Feb. 9, 2018

(86) PCT No.: PCT/IB2018/050802
§ 371 (c)(1),
(2) Date: Aug. 10, 2020

(87) PCT Pub. No.: WO2019/155258
PCT Pub. Date: Aug. 15, 2019

(65) Prior Publication Data
US 2021/0012319 A1  Jan. 14, 2021

(51) Int. Cl.
*G06Q 20/32* (2012.01)
*G06K 7/10* (2006.01)
(Continued)

(52) U.S. Cl.
CPC ..... *G06Q 20/3278* (2013.01); *G06K 7/10366* (2013.01); *G06Q 20/204* (2013.01);
(Continued)

(58) Field of Classification Search
CPC ........ H04L 67/34; H04L 67/52; H04L 63/08; H04L 63/0428; G06Q 30/0637; G06Q 10/00
(Continued)

(56) References Cited

U.S. PATENT DOCUMENTS

2012/0244805 A1* 9/2012 Haikonen ......... H04W 52/0274
340/636.1
2014/0254470 A1* 9/2014 Wendling ................ H04B 7/15
370/315
(Continued)

FOREIGN PATENT DOCUMENTS

| CN | 101835157 A | 9/2010 |
| CN | 102938939 A | 2/2013 |

*Primary Examiner* — Olusegun Goyea
(74) *Attorney, Agent, or Firm* — Propagate IP Limited; Joon Hyuk Imm

(57) ABSTRACT

A battery-less active and passive hybrid device for secure wireless payment comprising a secure element adapted for storing at least one secure payment applet and at least one token for secure contactless payment and operatively connected with an active operation unit and a passive operation unit; wherein the hybrid device is configured to be switchable between an active state in which the active operation unit is activated wirelessly on demand to enable the hybrid device to function as an active device and adapted for provisioning a personalization information of a payment card and/or a payment token of the device to the secure element; and a passive state in which the active operation unit is deactivated and the passive operation unit is activated to enable the hybrid device to function as a passive device and adapted for conducting payment token verification and/or contactless payment transaction operation via the secure element.

16 Claims, 3 Drawing Sheets

(51) Int. Cl.
  *G06Q 20/20* (2012.01)
  *G06Q 20/34* (2012.01)
  *G06Q 20/40* (2012.01)
  *H04B 5/79* (2024.01)

(52) U.S. Cl.
  CPC ....... *G06Q 20/321* (2020.05); *G06Q 20/3226* (2013.01); *G06Q 20/3263* (2020.05); *G06Q 20/34* (2013.01); *G06Q 20/40* (2013.01); *H04B 5/79* (2024.01)

(58) Field of Classification Search
  USPC .......................... 345/173; 370/315; 455/41.2
  See application file for complete search history.

(56) References Cited

U.S. PATENT DOCUMENTS

| | | | |
|---|---|---|---|
| 2016/0085329 A1* | 3/2016 | Yim | H04L 63/08 |
| | | | 345/173 |
| 2018/0063287 A1* | 3/2018 | Pottier | H04L 67/34 |
| 2019/0095655 A1* | 3/2019 | Krawczewicz | H04L 9/3249 |

* cited by examiner

BATTERY-LESS ACTIVE AND PASSIVE HYBRID DEVICE FOR SECURE WIRELESS PAYMENT AND METHOD THEREOF

TECHNICAL FIELD

The present disclosure relates to an electronic device, and more particularly to a battery-less active and passive hybrid device for secure wireless payment comprising a secure element.

BACKGROUND ART

Named for its founders (Europay, MasterCard, and Visa) in 1994, EMV now defines a set of security standards for credit and debit card transactions that can be used for NFC mobile and contactless payments. The "EMV cards" or "EMV credit cards" use a smart chip instead of a magnetic stripe to hold the data required to process a transaction. EMV brings increased security and global interoperability to card and mobile payments. The chip on an EMV card is capable of much more sophisticated authentication than magnetic-stripe cards. Essentially, there is a fully operating computer system embedded in every EMV card. The chip is tamper-proof, making the card nearly impossible to clone.

As EMV is almost one hundred percent effective when it comes to preventing face-to-face (in-store) counterfeit card fraud, and the tap-and-go convenience of a contactless EMV card is likely leading to increased loyalty and spending on that card. In this way, it is desirable to incorporate the EMV card or the like into various mobile wearable devices for conducting contactless or mobile payment operations.

With mobile EMV the customer's account credentials are loaded directly onto an NFC-enabled cell phone or wearable device. This is just as secure as contactless EMV, but with superior convenience and added opportunities, In particular, existing contactless payment systems are making use of EMV credit cards or equivalent cards (e.g. UnionPay cards) and smart mobile devices that use wireless communication module (e.g. NFC) for making secure payments, such as smartphones, smartwatches, or the like.

The embedded chip and antenna of the contactless payment system enable users to wave their smartphones or smartwatches over a reader at the point of sales terminal to make relatively low value transactions. As you don't need to count your coins or pull out your bulky wallet to pay in cash anymore, so no more awkward moments when there is a long queue staring at you counting money. Worldwide fast food chains and convenient stores are already using these POS terminals for conducting contactless payment transactions.

The smart mobile devices, such as smartwatches, adopted by the contactless payment systems generally comprise a contactless active payment unit or module needs to be powered by an embedded powerful battery thereof. However, quite a few people do not want to use any smartwatch and prefer traditional watches for various reasons.

BRIEF SUMMARY OF INVENTION

The present disclosure relates to a battery-less active and passive hybrid device for secure wireless payment comprising a secure element adapted for storing at least one secure payment applet and at least one token for secure contactless payment and operatively connected with an active operation unit and a passive operation unit; wherein the hybrid device is configured to be switchable between an active state in which the active operation unit is activated wirelessly on demand to enable the hybrid device to function as an active device and adapted for provisioning a personalization information of a payment card and/or a payment token of the device to the secure element; and a passive state in which the active operation unit is deactivated and the passive operation unit is activated to enable the hybrid device to function as a passive device and adapted for conducting payment token verification and/or contactless payment transaction operation via the secure element. As the hybrid device is battery-less and activated wirelessly on demand, it can be incorporated into a traditional timepiece or the like for provision of contactless payment capability.

The present disclosure also relates to a method for providing contactless payment capabilities to a traditional wearable device by a battery-less active and passive hybrid device for secure wireless payment comprising a secure element adapted for storing at least one secure payment applet and at least one token for secure contactless payment and operatively connected with an active operation unit and a passive operation unit, comprising steps of: mounting the battery-less active and passive hybrid device at the traditional wearable device; switching the hybrid device to an active state by having the active operation unit activated wirelessly on demand to enable the hybrid device to function as an active device and the secure element provisioned with a personalization information of a payment card and/or a payment token of the device; and switching the hybrid device to a passive state by having the active operation unit deactivated and the passive operation unit activated to enable the hybrid device to function as a passive device and the secure element configured for conducting payment token verification and/or contactless payment transaction operation.

In some embodiments, while in the active state the active operation unit is activated by operatively coupled with and powered wirelessly by a wireless power transfer unit for conducting wireless data communication with a provisioning unit, preferably a smartphone, for provisioning of the personalization information of the payment card and/or the payment token of the device to the secure element from the provisioning unit. The employment of the active operation unit enables the user to make use of other card by provisioning the personalization information of new payment card.

In some other embodiments, while in the passive state the passive operation unit is activated by operatively coupled with and wirelessly powered by a payment transaction unit, preferably a POS terminal, for conducting payment token verification and/or contactless payment transaction operation with the payment transaction unit via the secure element.

In some embodiments of the hybrid device according to the present disclosure, the active operation unit comprises a first wireless communication unit adapted for coupling and conducting wireless data communication with the personalization information and payment token provisioning unit, and operatively coupled with a wireless power receiver unit and/or an optional transient power storage unit, preferably a supercap, adapted for receiving and/or storing power from the coupled wireless power transfer unit. In some embodiments, the transient power storage unit is omitted though the incorporation of the optional transient power storage unit might enable the hybrid device to be operated continuously as an active device for a period of time when the power transfer unit is decoupled with the active operation unit, which might be desirable to some specific applications.

In some embodiments, the first wireless communication unit is a WIFI, BLE, and/or NFC enabled communication unit, and preferably a Qi enabled BLE unit with a Qi standard power receiver. Preferably, the wireless power transfer unit is a Qi standard power transmitter.

In some embodiments, the passive operation unit comprises a second wireless communication unit, preferably NFC enabled communication unit, adapted for coupling and conducting wireless data communication with the payment transaction unit and operatively coupled with an antenna unit for receiving its operating power and payment transaction data and signals from the coupled payment transaction unit.

In some embodiments, the second wireless communication unit is a NFC enabled communication unit, and preferably a NFC passive target unit draw its operating power from the payment transaction unit acting as a NFC initiator unit. Preferably, the antenna unit comprises an antenna of a dimension of 10×24 mm.

In some embodiments, the secure element, the active operation unit, and the passive operation unit are configured to be operatively coupled with each other and mounted on a bendable board adapted for easy mounting on a non-planar or a curved surface or being readily insertable or embedded into a curved accommodating space.

The hybrid device provided by the present disclosure is simple in structure, reasonable in design, high in comfort and low in cost, such that it enables a proper integration with a traditional wearable device and the provision of a versatile wearable device for secure wireless payment.

BRIEF DESCRIPTION OF DRAWINGS

The present disclosure will be described in details below with reference to the accompanying drawings, in which.

DETAILED DESCRIPTION OF INVENTION

The present disclosure will now be described in further details with reference to the accompanying drawings and embodiments, so as to make the objects, technical solutions and advantages of the present disclosure more apparent.

The present disclosure relates to devices and methods for use with EMVCo payment applets provisioning processes on secure element residing on a battery-less and bendable active board environment. The respective terms "EMVCo" or "EMV" means a consortium of Europay, MasterCard, Visa and others, "SE" means a secure element, "NFC" means Near Field Communications or relevant protocols, "BLE" means Bluetooth low energy or the like, and "Payment Applets" means contactless applications residing in SE.

Further, the term "Bendable Active Board" means a platform of bendable nature that consists of a SE for storing secure payment applets and tokens; a Bluetooth module for communications with paired devices; an NFC inductance antenna to receive power from NFC point of sale terminal in turn powering the SE; a wireless interface to receive power from an external source to enable the Bluetooth module on demand.

The respective terms "API" means application programming interface; "PAN" means a payment card primary account number; "Token" means a surrogate replacing the PAN, "Token services" means API offerings from payment network schemes not limited to Visa and Mastercard, where the primary functions are to exchange payment card PANs with surrogates as well as the management of such payment accounts; "Token Band" means an active or passive wearable device or strap/band capable of storing payment token; 'Token Dock" means a standalone power source docking system capable of transferring power wirelessly to the to Token Band; "Basic Wearable" means wearable that do not support loading of third party applications; and "Smart Wearable" means wearable that can support loading of third party applications.

Figure 1:
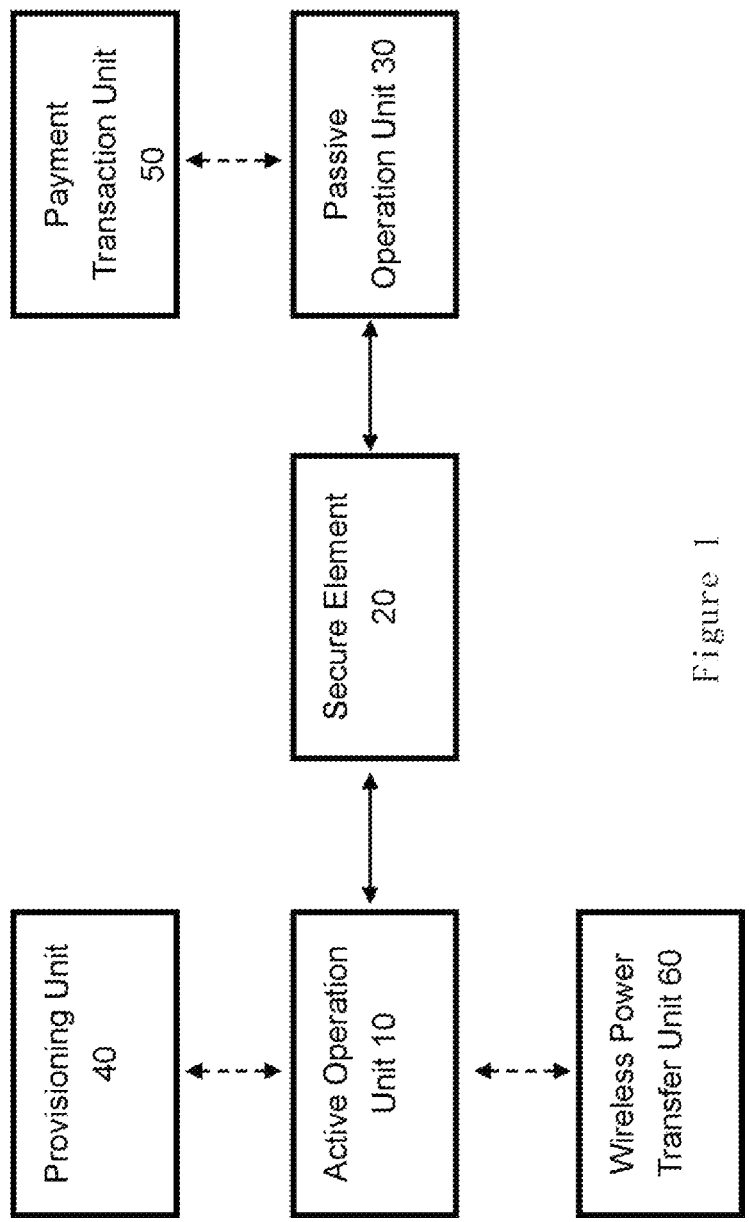
FIG. 1 is a block diagram of a battery-less active and passive hybrid device according to a preferred embodiment of the present disclosure.

Referring to FIG. 1, a block diagram of a battery-less active and passive hybrid device according to a preferred embodiment of the present disclosure is illustrated, according to which the hybrid device for secure wireless payment comprises a secure element 20 adapted for storing at least one secure payment applet and at least one token for secure contactless payment and operatively connected with an active operation unit 10 and a passive operation unit 30.

The hybrid device is configured to be switchable between an active state and a passive state in response to the working requirements and conditions for various operations as required. In the active state, the active operation unit 10 is activated and powered preferably wirelessly on demand, e.g, by an external power source or initiator/activator, to enable the hybrid device to function as an active device, and it is adapted for various operations requiring a relatively high and stable power consumption, among other, the operations for provisioning a personalization information of a payment card and/or a payment token of the device to the secure element. In this regard, the active operation unit enables the hybrid device to support installing and loading of third party applications by the end user.

In the passive state, the active operation unit is deactivated, and/or decoupled with external initiator, and the passive operation unit is activated to enable the hybrid device to function as a passive device and adapted for various operations requiring a relatively low or transient power consumption, among other, conducting payment token verification and/or contactless payment transaction operation via the secure element, wherein the low or transient operating power could be drawn from a predetermined matching device adapted for working with a passive device.

In some embodiments such as the embodiment as shown in the FIG. 1, while in the active state the active operation unit 10 is activated by operatively coupled with and powered wirelessly by a wireless power transfer unit 60 for conducting wireless data communication with a provisioning unit, such as a dedicated machine, or a computer, a smart or mobile device comes with a dedicated module for provisioning data to the secure element 20, whereby enabling the provisioning of the personalization information of the payment card and/or the payment token of the device to the secure element from the provisioning unit.

In some embodiment such as the embodiment as shown in the FIG. 1, while in the passive state the passive operation unit 30 is activated by operatively coupled with and wirelessly powered by a payment transaction unit 50, such as a dedicated machine terminal, or a computer, a smart or mobile device comes with a dedicated module for contactless payment transaction with the secure element 20, whereby enabling the conducting of payment token verification and/or contactless payment transaction operation with the payment transaction unit via the secure element.

In some embodiments, the active operation unit comprises a first wireless communication unit adapted for coupling and conducting wireless data communication with the personalization information and payment token provisioning unit. The first wireless communication unit is operatively coupled with a wireless power receiver unit and/or a transient power storage unit, preferably a supercap, adapted for receiving and/or storing power from the coupled wireless power transfer unit, so as to enable the completion of routine and specific operations of the hybrid device requiring a relatively high and stable operating power.

In some embodiments, the first wireless communication unit is a WIFI, BLE, and/or NFC enabled communication unit.

In some embodiments, the passive operation unit comprises a second wireless communication unit, adapted for coupling and conducting wireless data communication with the payment transaction unit and operatively coupled with an antenna unit for receiving its operating power and payment transaction data and signals from the coupled payment transaction unit.

In some embodiments, the second wireless communication unit is a NFC enabled communication unit acting as a NFC passive target unit configured to draw its operating power from the payment transaction unit acting as a NFC initiator unit.

In other embodiments, the first and second wireless communication unit are both or the same NFC enabled communication unit, namely the first wireless communication unit and the provisioning unit are both active mode NFC communication unit, as NFC devices can work in peer-to-peer mode, which enables two active mode NFC-enabled devices to communicate with each other to exchange information in an adhoc fashion, wherein one of the devices will deactivate its RF field while it is waiting for data.

In some embodiments, the antenna unit comprises an antenna of a dimension of 10×24 mm. The dimension is desirable for conducting stable and reliable data communication with the payment transaction unit without the need of incorporating an antenna booster to ensure proper operations of the passive operation unit, as could be found in some prior art devices using a relatively small or miniature antenna. If the dimension of the antenna is relative large, then the hybrid device could not entirely fit into some traditional wearable devices, such as a traditional watch and jewellery.

In some embodiments, the secure element, the active operation unit, and the passive operation unit are configured to be operatively coupled with each other and mounted on a bendable board adapted for easy mounting on a non-planar or a curved surface or being readily insertable or embedded into a curved accommodating space.

Figure 2:
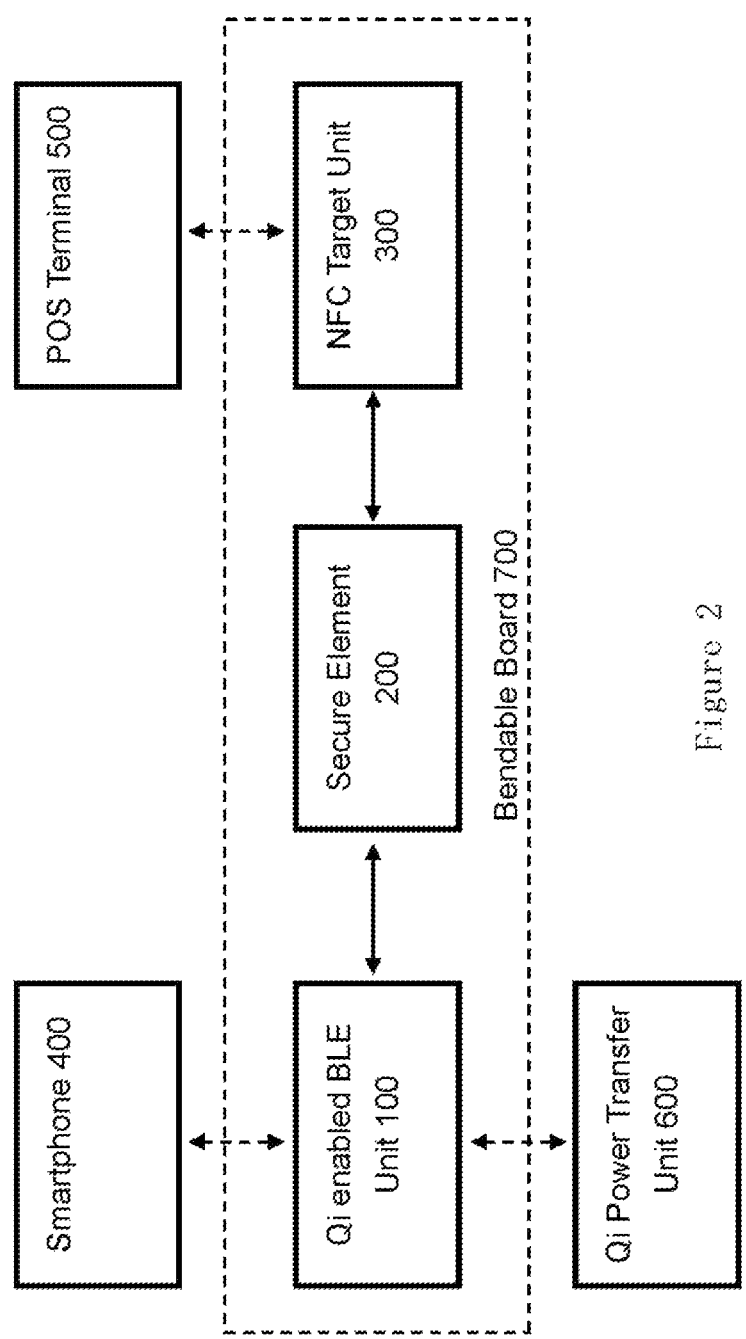
FIG. 2 is a block diagram of a battery-less active and passive hybrid device according to another preferred embodiment of the present disclosure.

Now referring to FIG. 2, a block diagram of a battery-less active and passive hybrid device according to another preferred embodiment of the present disclosure is illustrated, according to which the hybrid device for secure wireless payment comprises a secure element 200 adapted for storing at least one secure payment applet and at least one token for secure contactless payment and operatively connected with a Qi and BLE enabled active operation unit and a NFC enabled passive operation unit.

In some embodiments such as the embodiment as shown in the FIG. 2, the active operation unit is a Qi enabled BLE unit 100 comprising a Qi standard power receiver and the wireless power transfer unit is a Qi enabled power transfer unit 600 comprising a Qi standard power transmitter for providing wirelessly the power to the BLE unit for conducting wireless data communication with a provisioning unit, namely a smartphone 400 as shown in the FIG. 2. The passive operation unit is a NFC passive target unit 300 operatively coupled with and wirelessly powered by a payment transaction unit, namely a POS terminal 500, and configured to draw its operating power from the payment transaction unit acting as a NFC initiator unit for conducting payment token verification and/or contactless payment transaction operation with the payment transaction unit via the secure element 200.

Further, in the hybrid device as shown in FIG. 2, the secure element 200, the Qi enabled BLE unit 100, and the NFC passive target unit 300 are operatively coupled with each other and mounted on a bendable board 700 adapted for easy mounting on a non-planar or a curved surface and/or being readily insertable or embedded into a curved accommodating space.

In some embodiments, the hybrid device is mounted at and preferably embedded into a band or buckle of a traditional watch to replace the original band or buckle of the watch of a user for conducting contactless payment transactions and other applicable operations, such that the user could wear and use the watch in a traditional way while benefit from the contactless payment capabilities provided by the new and replaceable part of the watch.

Traditional watches are composed of mostly mechanical components and metal materials for the casing attached to a band or wrist strap. The wrist strap also can be produced in a variety of materials including leather, plastic, metals etc. Adding smart features such as payment applets on this segment of wearable under normal circumstances require a battery source to enable communications with external devices such as a smart phone.

The challenges or issues with adding an integrated battery source to a traditional wearable product are as follows:
  design and aesthetic issue, wherein the battery is rigid and the placement can take up space adding unnecessary thickness impacting aesthetic and designs;
  battery recharging issue, wherein the recurring use of a rechargeable battery requires added components and interface such as cable attachment to the device impacting aesthetics and productions costs of the final product;
  battery replacement issue, wherein all battery has a limited lifespan which needs replacement, whether or not the battery is rechargeable; and
  water resistant issue, wherein enclosure of battery and recharging cable interface can limit the water resistant ability of the overall device.

Accordingly, the technical solutions set forth by the present disclosure could apparently solve the foregoing technical problems for providing power to traditional and basic wearable product (including but not limited to, timepiece and jewellery) on demand while removing the dependency and need of an integrated battery. The present disclosure combines a bendable board enabling a unique payment token provisioning sequence to add NFC payment capabilities on traditional and basic wearable products without the need of an integrated battery source. The ability to decouple the battery from the wearable while having the ability to enable communications with smart devices through Bluetooth technology is critical in overcoming all of foregoing challenges or issues in the prior art.

Figure 3:
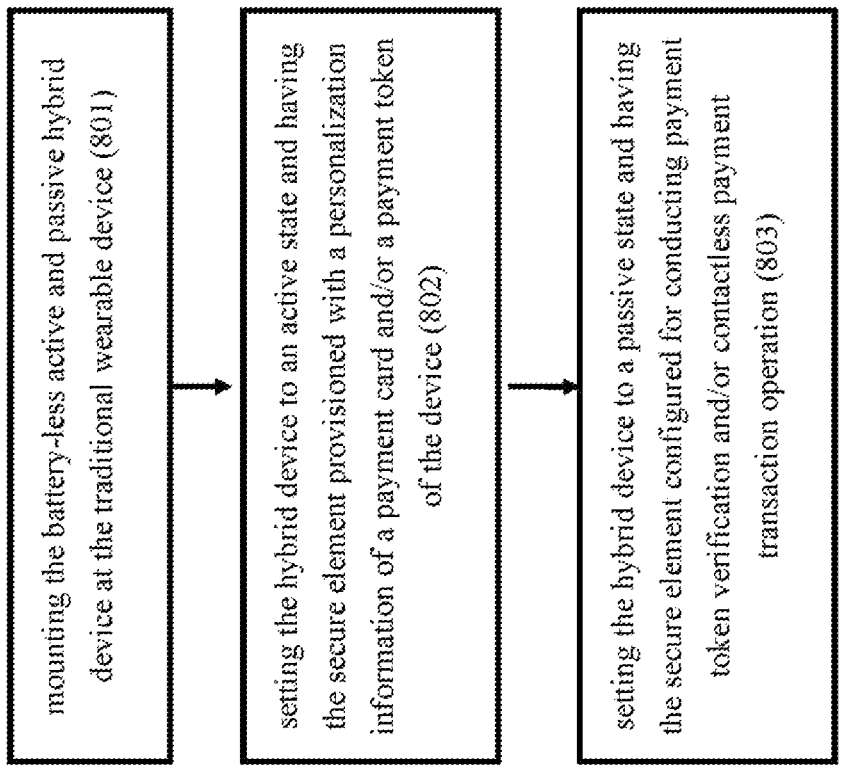
FIG. 3 is a flow chart of a method for providing contactless payment capabilities to a traditional wearable device by a battery-less active and passive hybrid device according to a further preferred embodiment of the present disclosure.

Referring to FIG. 3, which illustrates a flow chart for a method for providing contactless payment capabilities to a traditional wearable device by a battery-less active and passive hybrid device for secure wireless payment comprising a secure element adapted for storing at least one secure payment applet and at least one token for secure contactless payment and operatively connected with an active operation unit and a passive operation unit, comprising steps of:

mounting/embedding the battery-less active and passive hybrid device at/into the traditional wearable device (801);

switching/setting the hybrid device to an active state and having the secure element provisioned with a personalization information of a payment card and/or a payment token of the device (802); and switching/setting the hybrid device to a passive state and having the secure element configured for conducting payment token verification and/or contactless payment transaction operation (803).

In some embodiments, the foregoing method comprises the steps of:

mounting/embedding the battery-less active and passive hybrid device at/into the traditional wearable device, including a timepiece, a jewellery, a decorative accessory, and a combination thereof;

switching/setting the hybrid device to an active state by having the active operation unit activated wirelessly, or by an engageable and decoupleable or removably/decoupleably connected external power transfer unit, on demand to enable the hybrid device to function as an active device and the secure element provisioned with a personalization information of a payment card and/or a payment token of the device; and switching/setting the hybrid device to a passive state by having the active operation unit deactivated wirelessly, or by disengaging/decoupleabling with the external power transfer unit, on demand and the passive operation unit activated/configured to enable the hybrid device to function as a passive device and the secure element configured for conducting payment token verification and/or contactless payment transaction operation.

According to another aspect of the present disclosure, which provides a provisioning process flow for a battery-less active and passive hybrid device for secure wireless payment comprising a secure element adapted for storing at least one secure payment applet and at least one token for secure contactless payment as follows:

Step 1: Place the token band or the hybrid device with the secure document on top of an activated or powered token dock to receive wirelessly power from the token dock to power its BLE unit.

Step 2: Start a mobile application on a smartphone and complete the standard BLE pairing with the token band to initiate token services provisioning request with payment networks.

Step 3: The mobile application subsequently communicates with the SE over global platform standards and completes the personalization of the payment token securely on the SE.

Step 4: Remove the token band from the token dock and place the nonpowered passive token band over an NFC enabled point of sales terminal, which exerts power to an antenna on the token band to communicate with the payment applet and complete a NFC contactless payment transaction with the terminal.

The present disclosure is described according to specific embodiments, but those skilled in the art will appreciate that various changes and equivalents might be made without departing from the scope of the present disclosure. In addition, many modifications might be made to the present disclosure without departing from the scope of the invention in order to adapt to specific circumstances or components of the present disclosure. Accordingly, the present disclosure is not limited to the specific embodiments disclosed herein, and shall include all embodiments falling within the scope of the claims.

The invention claimed is:

1. A battery-less active and passive hybrid device for secure wireless payment comprising a secure element adapted for storing at least one secure payment applet and at least one token for secure contactless payment and operatively connected with an active operation unit and a passive operation unit;

wherein the battery-less active and passive hybrid device is configured to be switchable between an active state in which the active operation unit is activated wirelessly on demand to enable the battery-less active and passive hybrid device to function as an active device and adapted for provisioning a personalization information of a payment card and/or a payment token of the battery-less active and passive hybrid device to the secure element; and a passive state in which the active operation unit is deactivated and the passive operation unit is activated/configured to enable the battery-less active and passive hybrid device to function as a passive device and adapted for conducting payment token verification and/or contactless payment transaction operation via the secure element;

wherein in the active state the active operation unit is activated by operatively coupled with and powered wirelessly by a wireless power transfer unit for conducting wireless data communication with a provisioning unit, preferably a smartphone, for provisioning of the personalization information of the payment card and/or the payment token of the battery-less active and passive hybrid device to the secure element from the provisioning unit; and wherein the active operation unit comprises a first wireless communication unit adapted for coupling and conducting wireless data communication with the personalization information and payment token provisioning unit, and operatively coupled with a wireless power receiver unit and/or a transient power storage unit, preferably a supercap, adapted for receiving and/or storing power from the coupled wireless power transfer unit.

2. The battery-less active and passive hybrid device according to claim 1, wherein in the passive state the passive operation unit is activated by operatively coupled with and wirelessly powered by a payment transaction unit, preferably a POS terminal, for conducting payment token verification and/or contactless payment transaction operation with the payment transaction unit via the secure element.

3. The battery-less active and passive hybrid device according to claim 1, wherein the first wireless communication unit is a WIFI, BLE, and/or NFC enabled communication unit, and preferably a Qi enabled BLE unit with a Qi standard power receiver.

4. The battery-less active and passive hybrid device according to claim 3, wherein the wireless power transfer unit is a Qi standard power transmitter.

5. The battery-less active and passive hybrid device according to claim 1, wherein the passive operation unit comprises a second wireless communication unit, preferably a NFC enabled communication unit, adapted for coupling and conducting wireless data communication with a payment transaction unit and operatively coupled with an antenna unit for receiving its operating power and payment transaction data and signals from the coupled payment transaction unit.

6. The battery-less active and passive hybrid device according to claim 5, wherein the second wireless communication unit is a NFC enabled communication unit acting as a NFC passive target unit configured to draw its operating power from the payment transaction unit acting as a NFC initiator unit.

7. The battery-less active and passive hybrid device according to claim 5, wherein the antenna unit comprises an antenna of a dimension of 10×24 mm.

8. The battery-less active and passive hybrid device according to claim 1, wherein the secure element, the active operation unit, and the passive operation unit are configured to be operatively coupled with each other and mounted on a bendable board adapted for easy mounting on a non-planar or a curved surface or being readily insertable or embedded into a curved accommodating space.

9. A method for providing contactless payment capabilities to a traditional wearable device by a battery-less active and passive hybrid device for secure wireless payment comprising a secure element adapted for storing at least one secure payment applet and at least one token for secure contactless payment and operatively connected with an active operation unit and a passive operation unit, comprising steps of:
  mounting or embedding the battery-less active and passive hybrid device at or into the traditional wearable device;
  switching or setting the battery-less active and passive hybrid device to an active state by having the active operation unit activated wirelessly on demand to enable the battery-less active and passive hybrid device to function as an active device and the secure element provisioned with a personalization information of a payment card and/or a payment token of the device; and
  switching or setting the battery-less active and passive hybrid device to a passive state by having the active operation unit deactivated and the passive operation unit activated/configured to enable the battery-less active and passive hybrid device to function as a passive device and the secure element configured for conducting payment token verification and/or contactless payment transaction operation;
  wherein in the active state the active operation unit is activated by operatively coupled with and powered wirelessly by a wireless power transfer unit for conducting wireless data communication with a provisioning unit, preferably a smartphone, for provisioning of the personalization information of the payment card and/or the payment token of the battery-less active and passive hybrid device to the secure element from the provisioning unit; and
  wherein the active operation unit comprises a first wireless communication unit adapted for coupling and conducting wireless data communication with the personalization information and payment token provisioning unit, and operatively coupled with a wireless power receiver unit and/or a transient power storage unit, preferably a supercap, adapted for receiving and/or storing power from the coupled wireless power transfer unit.

10. The method for providing contactless payment capabilities to traditional wearable device according to claim 9, wherein in the passive state the passive operation unit is activated by operatively coupled with and wirelessly powered by a payment transaction unit, preferably a POS terminal, for conducting payment token verification and/or contactless payment transaction operation with the payment transaction unit via the secure element.

11. The method for providing contactless payment capabilities to traditional wearable device according to claim 10, wherein the first wireless communication unit is a WIFI, BLE, and/or NFC enabled communication unit, and preferably a Qi enabled BLE unit with a Qi standard power receiver.

12. The method for providing contactless payment capabilities to traditional wearable device according to claim 11, wherein the wireless power transfer unit is a Qi standard power transmitter.

13. The method for providing contactless payment capabilities to traditional wearable device according to claim 9, wherein the passive operation unit comprises a second wireless communication unit, preferably a NFC enabled communication unit, adapted for coupling and conducting wireless data communication with a payment transaction unit and operatively coupled with an antenna unit for receiving its operating power and payment transaction data and signals from the coupled payment transaction unit.

14. The method for providing contactless payment capabilities to traditional wearable device according to claim 13, wherein the second wireless communication unit is a NFC enabled communication unit acting as a NFC passive target unit configured to draw its operating power from the payment transaction unit acting as a NFC initiator unit.

15. The method for providing contactless payment capabilities to traditional wearable device according to claim 13, wherein the antenna unit comprises an antenna of a dimension of 10×24 mm.

16. The method for providing contactless payment capabilities to traditional wearable device according to claim 9, wherein the secure element, the active operation unit, and the passive operation unit are configured to be operatively coupled with each other and mounted on a bendable board adapted for easy mounting on a non-planar or a curved surface or being readily insertable or embedded into a curved accommodating space.

\* \* \* \* \*